United States Patent

Jarrell et al.

[15] 3,705,483
[45] Dec. 12, 1972

[54] MULTI-ROW, MULTI-CROP HARVESTER

[72] Inventors: Virgil N. Jarrell, Viola, Del.; Arthur L. Towson, Lewiston, N.Y.

[73] Assignee: Chisholm-Ryder Company, Inc., Niagara Falls, N.Y.

[22] Filed: Jan. 22, 1971

[21] Appl. No.: 108,944

[52] U.S. Cl. ..................56/13.5, 56/126, 56/226, 56/364
[51] Int. Cl. ...........................................A01d 45/22
[58] Field of Search.............56/12.4, 12.5, 13.3, 13.5, 56/14.1, 14.2, 16.4, 16.5, 16.6, 17.3, 126–130, 220–226, 364; 130/30 D, 30 J

[56] References Cited

UNITED STATES PATENTS

| | | | |
|---|---|---|---|
| 2,022,779 | 12/1935 | Peppard | 56/126 |
| 2,179,937 | 11/1939 | Lamp | 56/364 |
| 2,499,047 | 2/1950 | Wilkins | 56/126 |
| 3,118,265 | 1/1964 | Shaver | 56/364 |
| 2,823,511 | 2/1958 | Beatty | 56/226 |
| 2,509,371 | 5/1950 | Schroeppel | 56/12.4 |
| 2,481,528 | 9/1949 | Nolt | 56/364 |
| 3,184,905 | 5/1965 | Hillier | 56/130 |

*Primary Examiner*—Antonio F. Guida
*Attorney*—Sommer & Weber

[57] ABSTRACT

A machine for harvesting crop from densely planted crop-bearing plants of relatively low height arranged in closely spaced rows and suitable for harvesting different types of crops such as snap beans, lima beans, peas, dry beans and the like. The harvester is preferably self-propelled and driven over the bed of plants to harvest in a single pass a swath of the plants including a multiplicity of rows by stripping the foliage and crop from the plants but leaving the stems still rooted in the ground and then separating the stripped foliage from the crop, returning it to the swath harvested and collecting the separated crop.

24 Claims, 23 Drawing Figures

INVENTORS
Virgil N. Jarrell
Arthur L. Towson
BY
Sommer, Weber + Gastel
ATTORNEYS

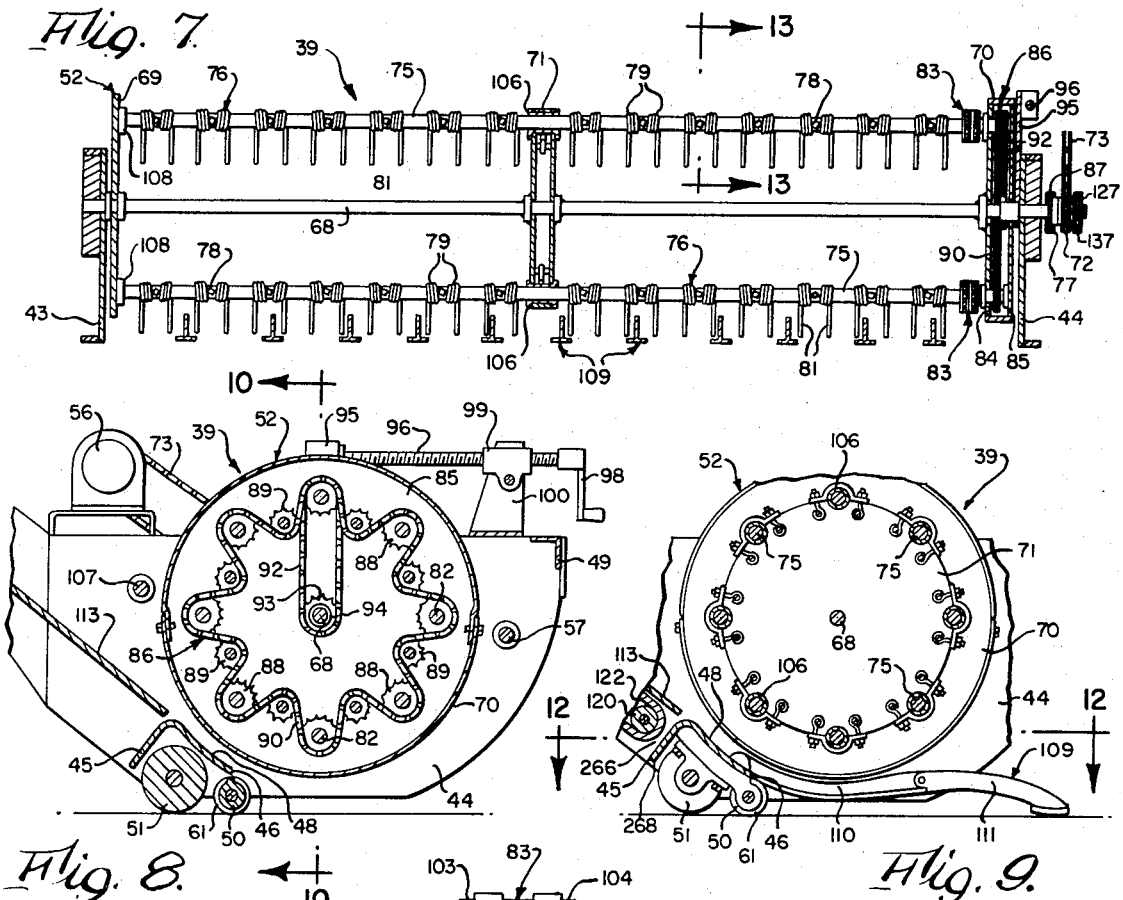

PATENTED DEC 12 1972
3,705,483
Fig. 15.
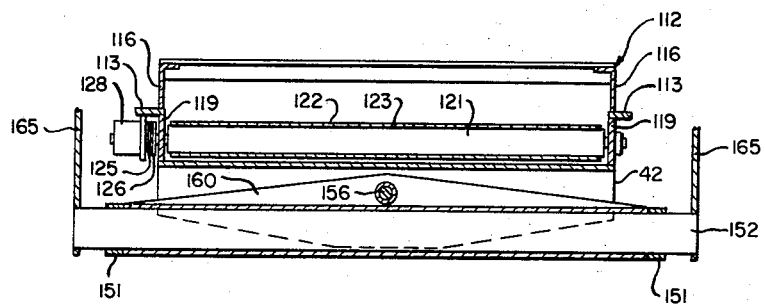
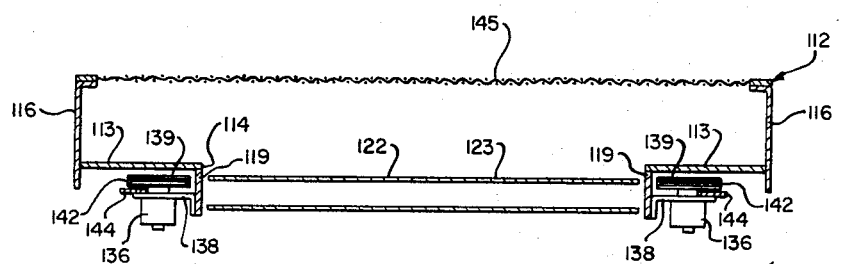
Fig. 16.
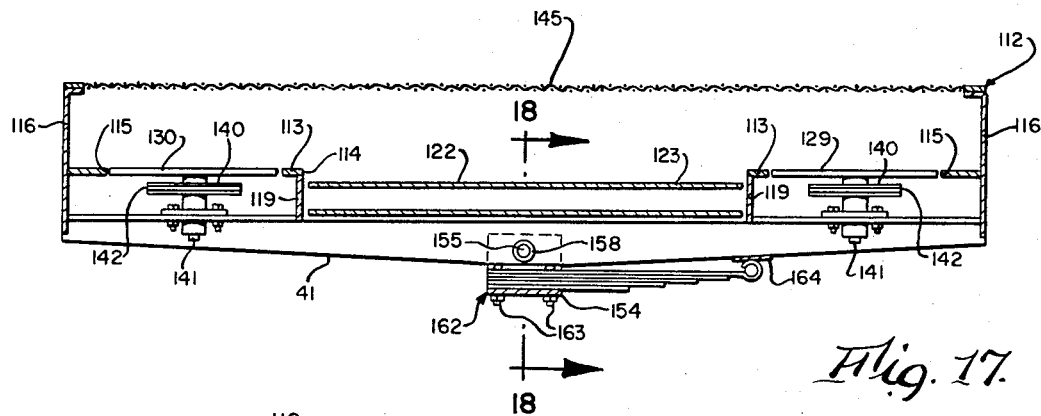
Fig. 17.
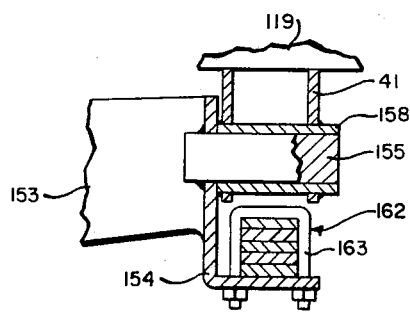
Fig. 18.
INVENTORS
Virgil N. Jarrell
Arthur L. Towson
BY
Sommer, Weber & Gastel
ATTORNEYS

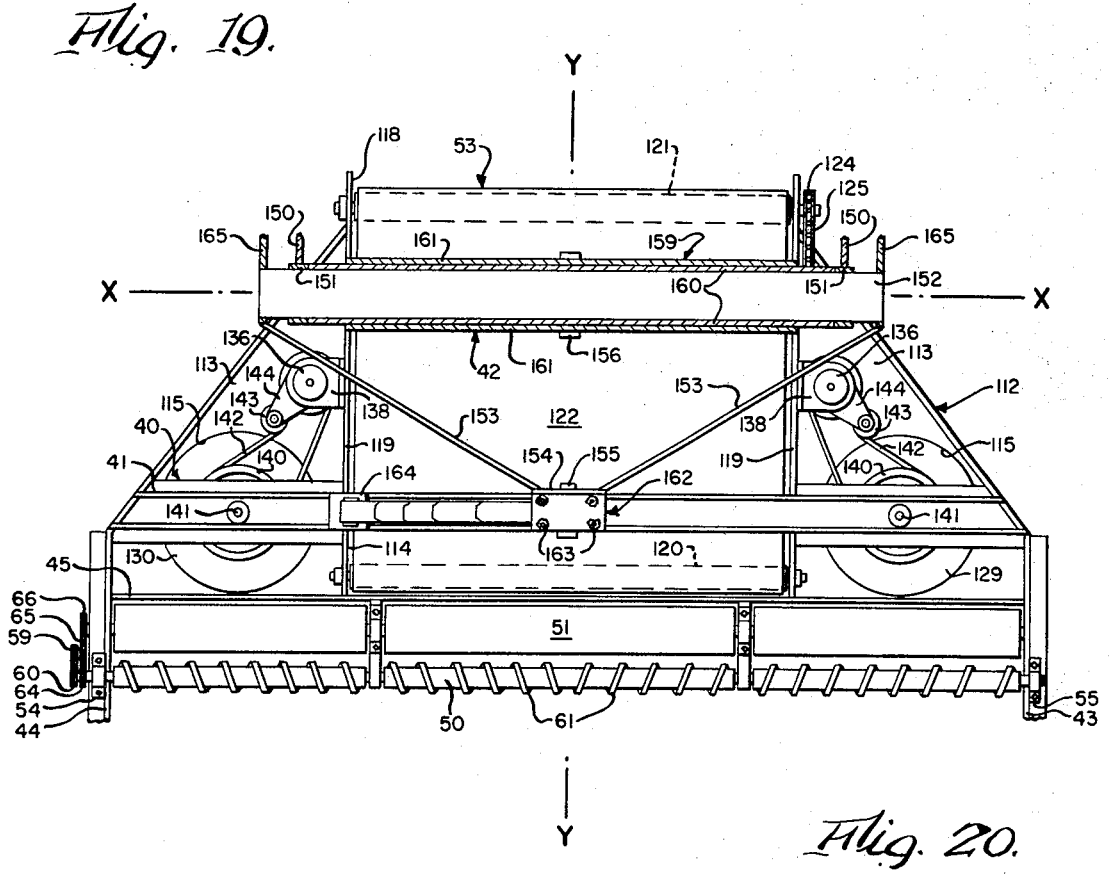

MULTI-ROW, MULTI-CROP HARVESTER

This invention relates to a harvester adapted to travel over relatively low plants bearing crop arranged in rows closely spaced together. Examples of crop bearing plants which may be harvested with the present invention include snap beans, lima beans, peas, dry beans and the like.

It is desirable for a number of reasons to plant crops of the type mentioned in closely spaced rows, say about 7 inches apart. One advantage is that the density of plant coverage and hence crop yield per unit area of ground is increased over that which would obtain if the rows of plant crops were spaced farther apart. Heretofore a row spacing of 36 inches was not uncommon.

Another advantage of such close spacing of the rows is that cultivation of the ground between rows can be eliminated. For example, ground may first be sprayed with a herbicide, then the seeds for the plants, such as bean plants, are planted, following which a second spraying of herbicide is applied. The plants grow without cultivation. Their foliage touches from row to row and this coupled with the effect of the herbicide suppresses weed development between rows.

Heretofore mechanical harvesters have been provided for harvesting the crop from plants arranged in rows but the rows had to be planted far enough apart such as the 36 inch spacing between rows previously mentioned to allow for travel of the harvester. Such a prior art harvester typically would harvest two rows at a time by elongated picking mechanisms which extended generally longitudinally of the rows.

Plants in closely spaced rows heretofore were either hand picked of their crop, an impractical procedure where large acreage is involved; or cut off by a cutter bar windrowed, collected and then harvested of their crop, also an impractical procedure because of the excessive effort and handling required.

In accordance with the present invention, a harvester is provided which effectively and efficiently strips relatively low plants of the type previously mentioned arranged in closely spaced rows without plugging the harvester so that the advantages of high density planting can be utilized.

An important object of the present invention is to provide such a harvester which has a width such as 7 or 8 feet so as to cover a plurality of closely spaced rows of plants while traveling thereover which will effectively strip the foliage and crop from the plants without pulling the plants from the ground.

Another object of the present invention is to provide such a harvester which is versatile in use, being capable of harvesting crops from different types of plants, such as snap beans, lima beans, peas, dry beans and the like.

In accordance with the present invention, a harvester is provided which is adapted to travel over plants bearing crop to be harvested, such harvester comprising a fixed member proximate ground level having a leading edge extending transversely of the line of harvester travel and also having an upper surface, a driven roller extending along said edge and projecting forwardly therefrom and adapted to engage the plants to be harvested, rotating means arranged to drive said roller in a direction so that its leading side moves downwardly thereby to urge the stems of such plants downwardly back toward the ground, stripping means arranged to lay the plants rearwardly over said roller and onto said surface and to strip the foliage and crop from said plants substantially without uprooting their stems, and means for conveying the stripped foliage and crop away from said stripping site.

A further feature of the invention is to drive such plant engaging roller preferably at a peripheral speed greater than the peripheral speed would be if such roller rolled on the ground.

A still further feature of the invention is to provide such plant engaging roller preferably with an upset peripheral surface such as provided by a helical land or thread so that the plants are urged to move longitudinally of the axis of the roller while extending across the roller, thus allowing for more efficient and effective stripping of the foliage and crop.

Another feature of the invention is to provide a picker mechanism which is preferably mounted on the front end of a self-propelled vehicle so that such mechanism in use can rest and roll along the ground, following undulations and irregularities in ground surface, both laterally and longitudinally of the direction of harvester travel.

Still another feature of the invention is to provide such a picker mechanism which can be lifted off the ground to an inoperative traveling position, utilized for example, when the harvester is in transit to and from a point of use.

Other objects and advantages of the present invention will be apparent from the following detailed description of a preferred embodiment illustrated in the accompanying drawings wherein:

FIG. 7 is an enlarged vertical longitudinal sectional view of a picker mechanism at the front end of the harvester and showing a tined reel for stripping foliage and crop, this view being taken transversely of the harvester on line 7—7 of FIG. 4.

FIG. 8 is an enlarged fragmentary vertical transverse sectional view of said picker mechanism to show the drive for said reel at one end thereof, this view being taken longitudinally of the harvester on line 8—8 of FIG. 4.

FIG. 9 is a similar enlarged fragmentary vertical transverse sectional view of said picker mechanism but taken substantially centrally and longitudinally of the harvester on line 9—9 of FIG. 4.

FIG. 10 is an enlarged fragmentary vertical sectional view through the reel drive mechanism, taken on line 10—10 of FIG. 8.

FIG. 11 is an enlarged fragmentary longitudinal sectional view of a rod coupling shown in FIG. 10, taken on line 11—11 thereof.

FIG. 12 is a fragmentary top plan view of a foliage lifter arm shown in FIG. 9, taken on line 12—12 thereof.

FIG. 13 is an enlarged vertical sectional view showing a tine mounting, taken on line 13—13 of FIG. 7.

FIG. 14 is a fragmentary vertical sectional view thereof, taken on line 14—14 of FIG. 13.

FIG. 15 is an inclined transverse sectional view of the harvester showing the mounting of said picker mechanism on the front end of the main frame of the harvester, this view looking rearwardly and upwardly and taken on line 15—15 of FIG. 2.

FIG. 16 is a similar inclined transverse sectional view but of an intermediate part of said picker mechanism, taken on line 16—16 of FIG. 2.

FIG. 17 is another inclined transverse sectional view of said picker mechanism, taken on line 17—17 of FIG. 2.

FIG. 18 is an enlarged fragmentary sectional view thereof, taken longitudinally of the harvester on line 18—18 of FIG. 17.

FIG. 19 is an enlarged fragmentary generally horizontal bottom view of said picker mechanism at the front end of the harvester with only some of the mounting parts being shown in section, this view being taken generally on line 19—19 of FIG. 2.

FIG. 20 is an enlarged fragmentary vertical transverse sectional view of said picker mechanism and showing in elevation the ground engaging roller, taken on line 20—20 of FIG. 2.

FIG. 21 is a similar enlarged fragmentary vertical transverse sectional view of said picker mechanism and showing in elevation the plant engaging roller, taken on line 21—21 of FIG. 2.

Figure 1:
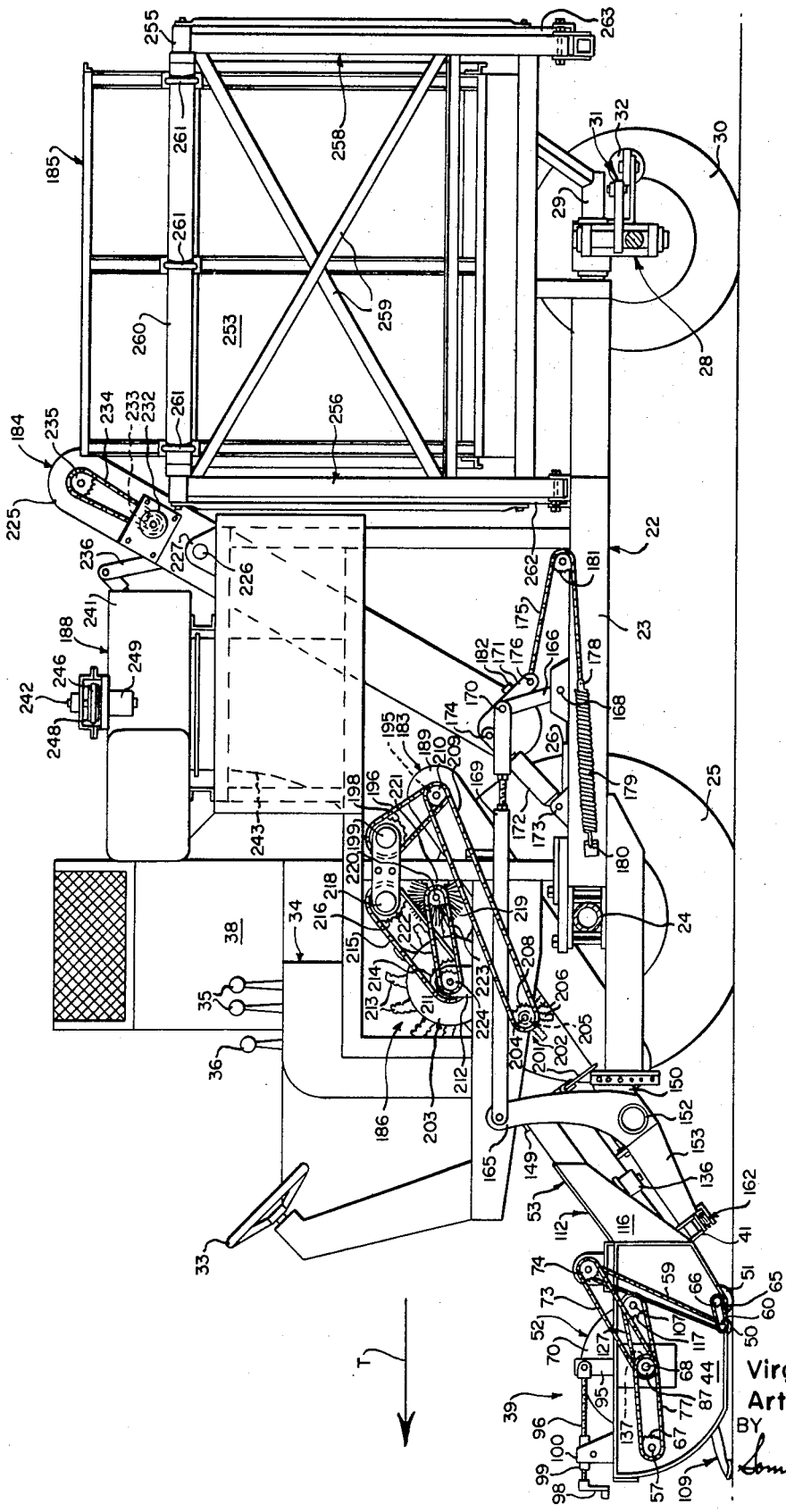
FIG. 1 is an elevational view of the left side of a harvester embodying the present invention, the harvester being illustrated with the proximate front and rear wheels removed so as to reveal other structure.

The harvester embodying the present invention is illustrated as a self-propelled wheeled vehicle comprising a main frame 22 including a pair of transversely spaced longitudinal lower beams 23, 23 connected by a transverse front axle 24, a drive wheel 25 at each end of said axle, means for controllably driving said wheels such as a hydraulic propulsion motor 26, a rear axle assembly 28 pivotally mounted to the main frame for pivotal movement about a pivot pin 29 extending fore and aft of the harvester, a rear wheel 30 at each end of said rear axle and a suitable steering mechanism 31 for such rear wheels including a hydraulically driven piston and cylinder type actuator 32. The harvester is driven by a steering wheel 33 having a suitable connection (not shown) with steering mechanism 31. The operator sits on a seat 34 behind wheel 33 adjacent to which within the operator's reach are the various controls such as those indicated at 35 on one side and at 36 on the other side to control the operation of the harvester including an engine 38 powering a suitable oil pump mechanism (not shown) to generate a supply of pressurized oil for the operation of motor 26 and other hydraulic motors utilized to drive other mechanisms as hereinafter described.

A picking mechanism generally indicated at 39 is arranged at the front end of the harvester and is suitably mounted on main frame 22 for pivotal movement about an axis X—X (FIG. 19) extending transversely of the line of harvester travel represented by the arrow T in FIG. 1 so that the elevation of mechanism 39 can be changed, and also mounted for pivotal movement about an axis Y—Y extending generally perpendicularly to such transverse pivotal axis so that the picking mechanism can oscillate laterally to follow lateral unevenness in the ground over which the harvester travels when being operated.

Picking mechanism 39 comprises a subframe 40 including channel-shaped transverse front and rear frame beams 41 and 42, respectively, and right and left vertical parallel front side walls 43 and 44, respectively. Rigidly connecting these side walls together adjacent their rear lower ends is a fixed horizontal member 45 proximate ground level having a leading edge 46 extending transversely of the line of harvester travel and also having an upper surface 48 shown as slightly concave. A front transverse bar 49 rigidly connects side walls 43 and 44 adjacent their front upper corners. A driven roller 50 extends along edge 46 and projects forwardly therefrom and is adapted to engage the plants to be harvested. Behind this plant engaging roller 50 and under member 45 is a driven ground engaging roller 51 which supports the picking mechanism as it is pushed over the ground.

The picking mechanism 39 further includes stripping means shown as a tined reel 52 arranged to lay the plants rearwardly over roller 50 and onto surface 48 and to strip the foliage and crop from the plants substantially without uprooting their stems; means indicated generally at 37 for leaning the tops of plants toward reel 52; means indicated generally at 47 for cleaning reel 52; and means indicated generally at 53 for conveying the stripped foliage and crop away from such stripping site.

Plant engaging roller 50 is shown in FIGS. 19 and 21 as suitably journaled at its opposite ends on side walls 43 and 44 and at two equal intervals along its length on journal blocks 54 and 55 carried by member 45. Means for rotating roller 50 are shown as comprising a hydraulic motor 56 mounted on left side wall 44 driving a sprocket gear 58 connected by a chain 59 to a driven sprocket gear 60 fast to the shaft end of this roller. Such roller rotating means drives roller 50 in a counterclockwise direction as viewed in FIG. 1 or in a clockwise direction as viewed in FIGS. 8 and 9 so that its leading or front side moves downwardly, and at a peripheral speed greater than the peripheral speed would be if this roller rolled on the ground. Preferably roller 50 has a upset peripheral surface so arranged as to move the plants longitudinally of this roller while laid thereacross, this upset surface being shown as provided by a helical land or thread 61 formed integrally on the roller. This helical land or thread 61 is shown in FIG. 21 as being in two half sections relative to the length of roller 50 so that this land or thread beginning midway of the roller length has a twist in one direction toward one end and an opposite twist toward the other end. As best shown in FIGS. 8 and 9, the leading edge 46 of member 45 is substantially tangent to the top of roller 50.

Ground engaging roller 51 is shown in FIGS. 19 and 20 as suitably journaled at its opposite ends on side walls 43 and 44 and at two equal intervals along its length on journal blocks 62 and 63 carried by member 45. Roller 51 is shown as driven from the shaft for roller 50 at about half the speed but in the same direction; however, roller 51 still has a peripheral speed faster than that which it would have if it rolled on the ground. Accordingly, a drive sprocket gear 64 is shown fast to the shaft for roller 50 and connected by an endless sprocket chain 65 to a driven sprocket gear 66 fast to the shaft for roller 51.

The stripping means shown as the tined reel 52 has a horizontal transverse axis of rotation provided by a shaft 68 arranged in front of, above and substantially parallel to plant engaging roller 50. This reel is further shown as comprising a right end head 69, a left end head 70, and an intermediate support member 71, all disc-shaped in outline, concentrically arranged and vertically disposed. These end heads and intermediate member are non-rotatively connected as by welding to central horizontal drive shaft 68 which at its opposite ends is suitably journaled on side walls 43 and 44. The left end of this shaft is shown in FIG. 10 as extending through left side wall 44 and has a driven sprocket gear 72 fast to its outer end. This sprocket gear is driven by an endless sprocket chain 73 passing around a drive sprocket gear 74 fast to the output shaft of hydraulic motor 56. This drive is such that the front or leading side of the reel 52 descends toward the ground.

Reel end heads 69, 70 and intermediate member 71 are shown as supporting an annular series of circumferentially spaced horizontal and parallel rods or tubes 75 each of which supports a plurality of tine devices 76. Eight such rods or tubes 75 are shown, best in FIG. 9, as spaced the same radial distance from the reel axis of rotation which is the longitudinal axis of drive shaft 68, and are also spaced apart equidistantly circumferentially. Fourteen tine devices 76 are shown arranged at substantially uniform intervals along each rod to form a row.

Figure 3:
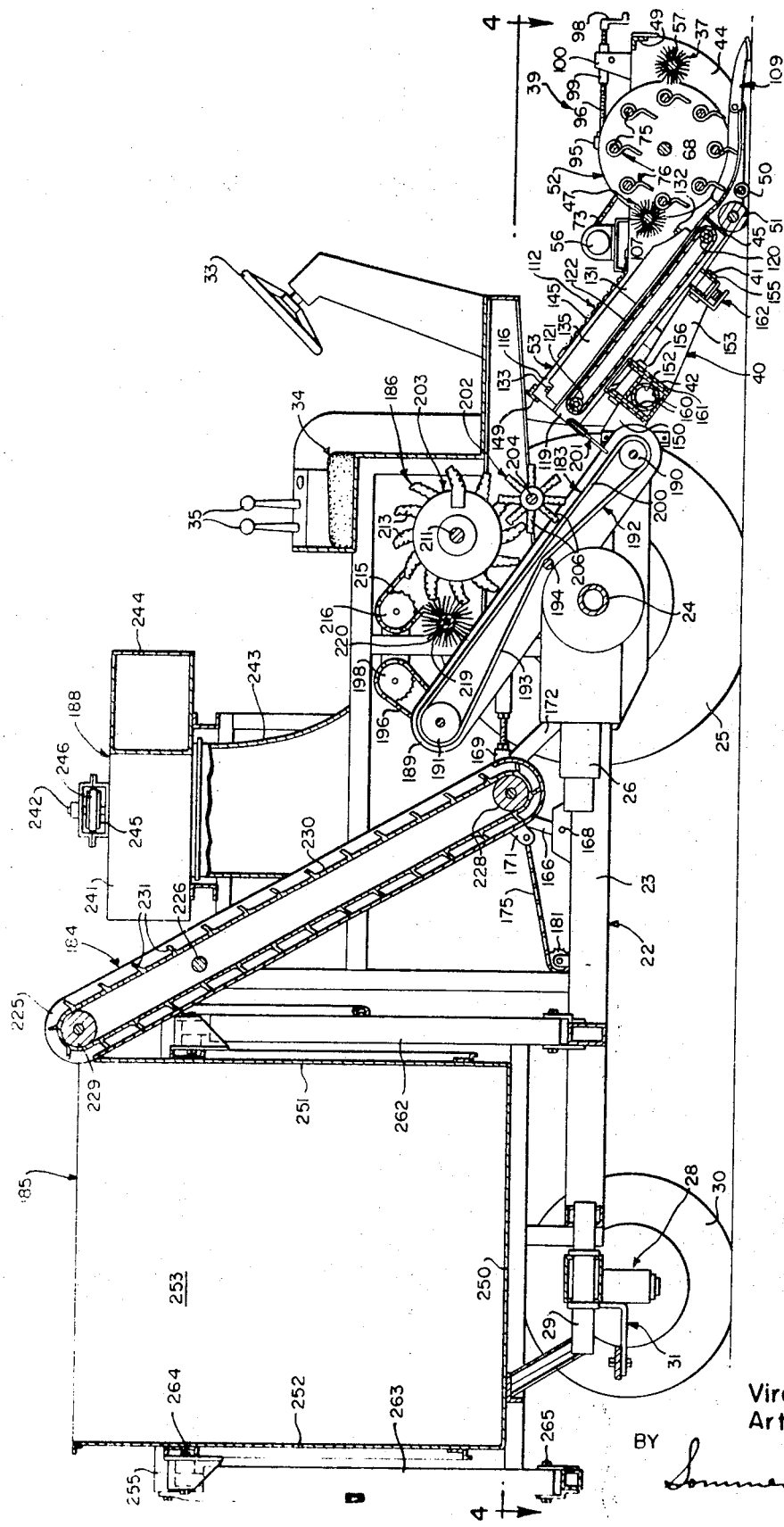
FIG. 3 is a vertical central longitudinal sectional view of the harvester as viewed from the right side of the same.

While the tine devices 76 may be variously constructed, each tine device 76 is shown in FIGS. 3, 13 and 14 as comprising a length of wire bent at its middle over one end of the shank of a bolt and nut fastener 78 which extends diametrically through the corresponding rod 75 and is then wrapped around this rod several times on each side of the fastener as indicated at 79 and the free ends extend generally tangentially and forwardly away from the rod to form a pair of tines or fingers 80, each preferably having an outer downturned straight end portion 81 bent in the direction of reel rotation as shown in FIG. 3, this being clockwise. The tine devices 76 on one rod 75 are offset longitudinally from those on an adjacent rod a distance about half the spacing between adjacent tines 80 in a given row so that a tine in one row will follow a path splitting the space between a pair of tines in an adjacent row and the combing or stripping action produced by the reel as a whole is more effective.

Means are provided for projecting the tines 80 downwardly at all times as the reel 52 rotates. For this purpose, each of rods 75 is suitably removably journaled at one end on right end head 69, and on intermediate member as indicated at 71, and includes a stub shaft section 82 at its left end non-rotatively joined to the main section by a coupling 83 and suitably journaled on the inner and outer walls 84 and 85, respectively of left end head 70, as best shown in FIG. 10. This left end head 70 houses a planetary drive mechanism 86 comprising a driven sprocket gear 88 fast to each stub shaft 82, an idler sprocket gear 89 arranged between each adjacent pair of sprocket gears 88 and suitably journaled on walls 84 and 85, and an endless sprocket chain 90 passing alternately over and under sprocket gears 88 and 89, as shown in FIG. 8. One of stub shafts 82 has a second sprocket gear 91 fast thereto around which passes an endless sprocket chain 92, also passing around a normally stationary sprocket gear 93 surrounding reel drive shaft 68 and concentric therewith. Sprocket gears 88, 89 and 93 are shown as being of the same size and having the same number of teeth. Idler sprocket gears 89 are radially set inwardly relative to sprocket gears 88 so as to increase the wrap of chain 90 around the latter.

It will be seen that with sprocket gear 93 stationary and reel 52 rotated about the axis of drive shaft 68 in a clockwise direction as viewed in FIG. 8, each stub shaft 82 and hence the corresponding main section of each tine supporting rod 75 will be translated in a circular orbital path without rotation about its own longitudinal axis, rotating relative to left end head 70 one revolution for every revolution of such end head so that the tines 80 depending from these rods maintain their downward projection at all times. This allows a better angle of attack by the tines on a plant to be harvested than if the tines merely projected radially outwardly at all times. With the arrangement shown the tines 80 descend substantially vertically into a plant and have penetrated the foliage thereof before there is much lateral movement or combing action through the foliage toward the rear of the harvester.

Different types of plants may be harvested best by the machine of the present invention if the tines 80 have a different disposition relative to the plant upon entering the same from above. This is considered the angle of attack. Such angle is variable according to the present invention. The means for achieving such variation selectively is accomplished by shifting the angular position of normally stationary sprocket gear 93. For this purpose, this sprocket gear 93 is shown as fast to an angularly movable sleeve 94 which surrounds reel drive shaft 68 and extends through outer wall 85. The outer end of this sleeve 94 has fast thereto an upstanding arm 95, the upper end of which is rotatively secured to the rear end of a generally horizontal elongated screw 96 extending fore and aft of the harvester. The front end of this screw 96 has a crank 98 secured thereto for turning the same. Intermediate its ends screw 96 passes through a nut 99 in threaded engagement therewith, this nut being pivotally mounted on a bracket 100 upstanding from left side wall 44.

By turning crank 98 in one direction, sleeve arm 95 is swung forwardly or rearwardly about the axis of reel drive shaft 68 and in this manner the angular position of sprocket gear 93 can be changed relative to end head 70 when the latter is stationary thereby through chain 92 and sprocket 91 and the planetary chain and sprocket mechanism 86 the angularity of the tines 80 will be shifted relative to the ground and hence their angle of attack adjusted as desired.

Adverting to coupling 83, as best shown in FIG. 11, this comprises a sprocket gear 101 non-rotatively secured to the end of a given rod 75 as by a set screw 97, a similar sprocket gear 102 similarly secured to the adjacent end of concentric stub shaft 82, and two endless sprocket chains 103 and 104 severally surrounding said sprocket gears and secured together by removable pins 105. The purpose of a coupling 83 on each rod 75 is to allow easy mounting of their stub shaft sections 82 on and in end head 70 when separate from the main rod section 75 and to allow ready removal of the main rod sections for replacement or repair of themselves or tine devices 76, if desired. In this connection split pillow block bearings 106 support rods 75 on intermediate member 71 so that by removing the fasteners for the cap portions of such bearings these rods can be readily removed. At right end head 69 each rod 75 is readily withdrawable from its bearing 108.

As the rows of tines 80 descend and penetrate plant foliage and thence move rearwardly, as reel 52 rotates, the plants are laid rearwardly over roller 50 and onto surface 48 of member 45. The tendency of roller 50 to drive or push the plant back toward the ground prevents the stems of the plants from being uprooted, while the stripping or combing action is being effected by the continued rearward and upward movement of the tines 80. This combing action strips the foliage and crop from the plant stems. In this connection, the tips of the tines 80 pass closely to concave surface 48 which has a curvature generated generally about the reel rotation axis so as to be concentric therewith.

In order to assist in presenting plants properly to the descending tines 80 on the forward side of the reel 52 and also to the roller 50, it may be desireable to employ plant foliage lifters 109. A plurality of such lifters are shown as arranged at equal intervals across the front end of the picking mechanism. Each such lifter is shown as having a forwardly projecting fixed inner arm section 110 secured at its rear end as by removable fasteners to member 45 and a pivoted front arm section 111 which can tip upwardly but not downwardly beyond a predetermined point.

Figure 4:
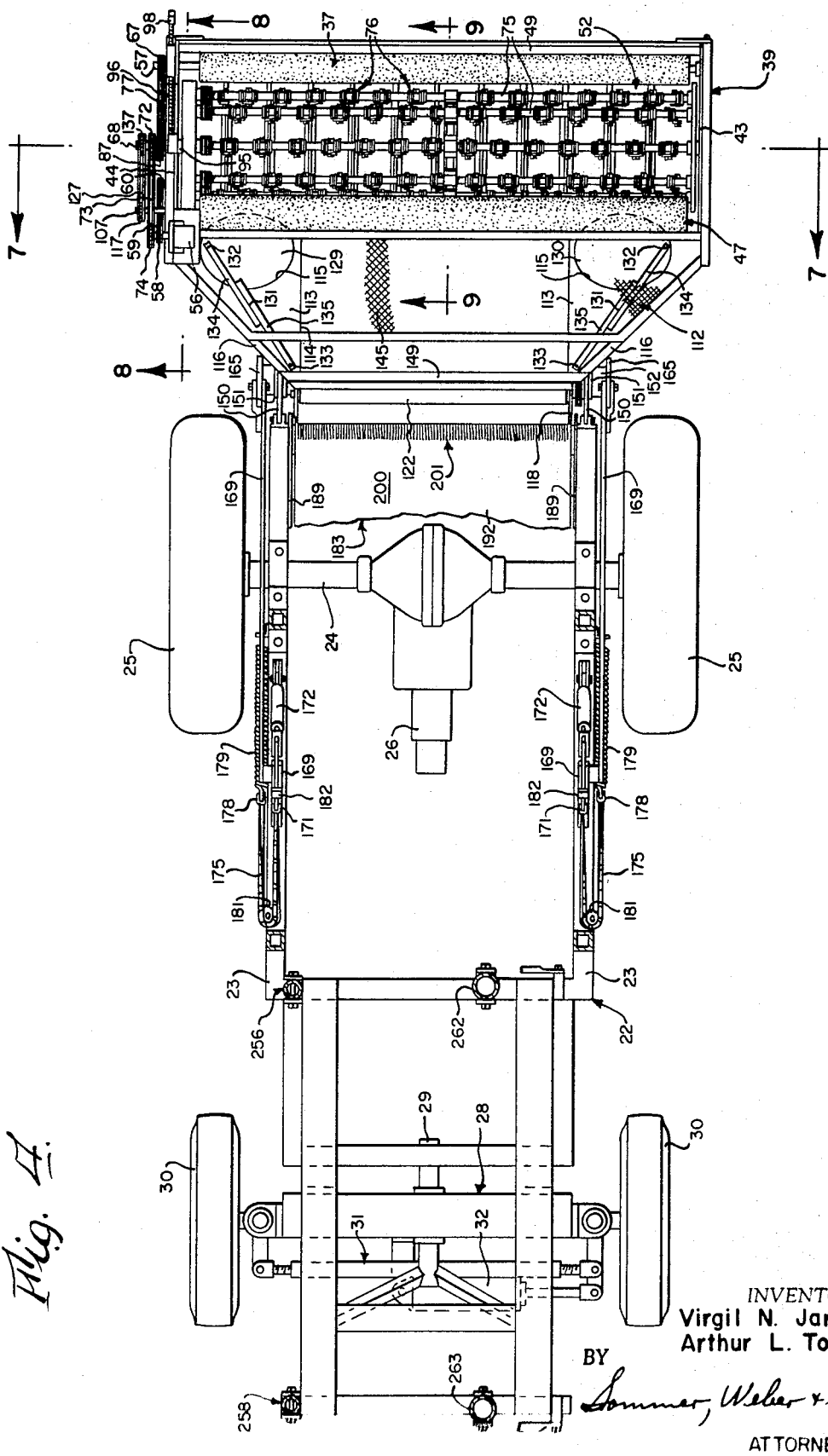
FIG. 4 is a downwardly directed horizontal sectional view of the harvester taken on line 4—4 of FIG. 3.
Figure 5:
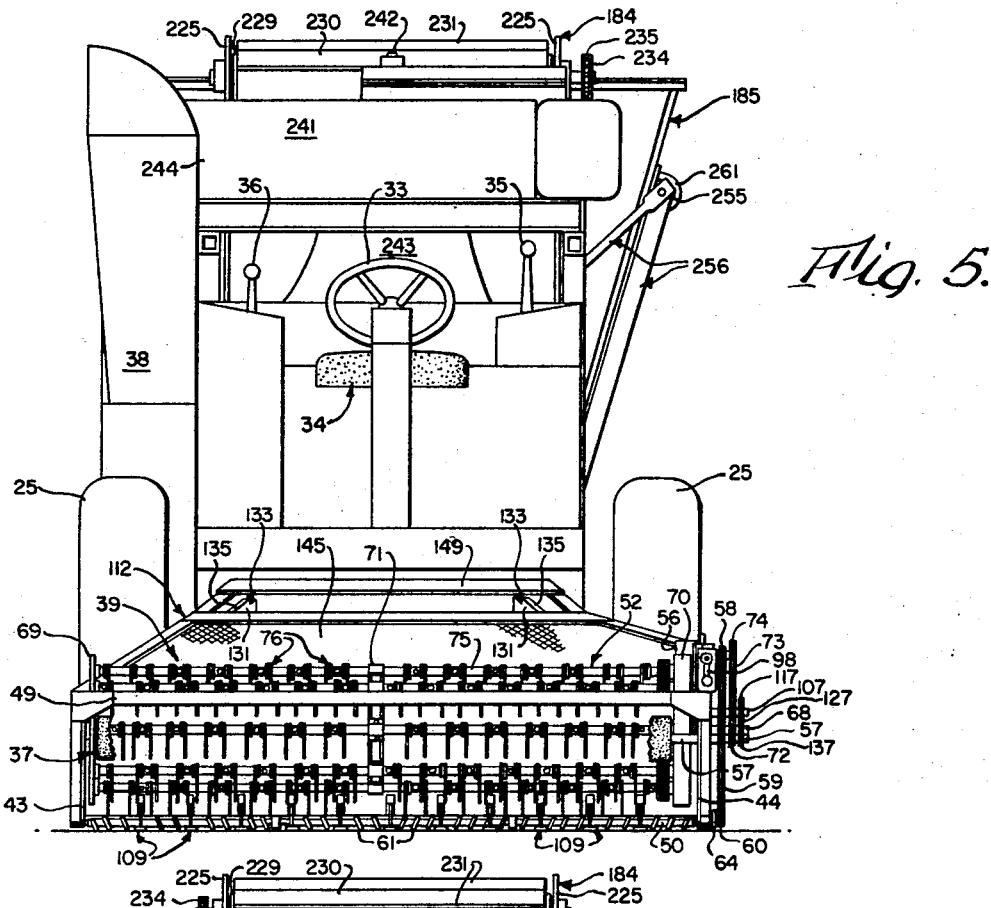
FIG. 5 is a front end elevational view of the harvester.

The plant top leaning means 37 comprises a rotary brush the shaft 57 of which is shown in FIG. 3 as being arranged in front of, slightly below and parallel to reel shaft 68. The ends of shaft 57 are suitably journaled on walls 43 and 44, the left end of this shaft extending through left wall 44 and fast to its outer end is a driven sprocket gear 67 connected by a sprocket chain 77 passing around a drive sprocket gear 87 fast to the outer left end of reel shaft 68, as best shown in FIGS. 1 and 4. Shaft 57 and hence brush 37 is rotated in a clockwise direction as viewed in FIG. 3 so that the tip portions of the radial bristles of this brush engage the top portions of the plants and urge them toward reel 52.

Trough means 112 are provided on the subframe 40 which extend rearwardly from member 45 and narrow in a rearward direction to direct and convey stripped foliage and crop toward the main frame 22 of the harvester. Such trough means is shown as including a floor 113 provided with a central rectangular opening 114 and a circular side opening 115 on each side of this central opening, and an upstanding side wall 116 along the lateral inclined edge of the floor on each side thereof. These side walls 116 converge toward each other in a rearward direction to provide a throat 118 through which the stripped foliage and crop is discharged. At their front ends trough walls 116 are secured as by welding to side walls 43 and 44. The fore and aft edges of rectangular opening 114 are connected to depending skirt panels 119 suitably supported on subframe transverse beams 41 and 42. Between these panels 119 is arranged conveyer means 53 comprising front and rear parallel transverse rollers 120 and 121, respectively, suitably journaled on these panels and around these rollers passes an endless conveyer belt 122 having a width closely equal to that of the spacing between said panels and including an upper flight 123 arranged slightly below the top surface of floor 113, as shown in FIGS. 15–17. The front end of this conveyer belt 122 is proximate the rear end of member 45. Rear roller 121 is shown as having a driven sprocket gear 124 fastened to its shaft on the right end thereof, connected by an endless sprocket chain 125 passing around a drive sprocket 126 fast to the output shaft of a hydraulic motor 128 shown in FIGS. 2 and 15 as mounted on right skirt panel 119. The direction of drive is counterclockwise as viewed in FIG. 2 so that the upper flight 123 of conveyer belt 122 moves rearwardly.

Means are provided on each lateral side of conveyer belt 122 for pushing stripped foliage and crop toward the upper flight 123 of this belt. Such means are shown as comprising left and right discs or turntables 129 and 130, respectively, severally rotatably arranged in circular openings 115 and each has an upper surface substantially coterminous with that of floor 113, and an extensible and contractible wall 131 at one end pivotally connected as indicated at 132 to said turntable adjacent its circular margin and at its other end pivotally supported as indicated at 133 proximate conveyer belt 122 adjacent the rear end thereof. Each wall 131 comprises two parts 134 and 135 one slidable on the other to vary the effective length of this wall.

Means are provided for driving the turntables 124 and 125 and are shown in FIGS. 16, 17 and 19 for each as comprising a hydraulic motor 136 mounted on a bracket 138 secured to the corresponding panel 119 and having a drive pulley 139 secured to its output shaft, a driven pulley 140 fast to a shaft 141 suitably journaled on front cross beam 41 and also secured at its upper end to the center of the corresponding turntable, an endless drive belt 142 passing around said pulleys, and a biased idler pulley 143 mounted on an arm 144 and bearing against the outside of said belt to remove the slack therefrom. As viewed from above as illustrated in FIG. 4, the left turntable 129 is rotated by its drive mechanism just described in a clockwise direction, and the right turntable 130 is rotated by its similar drive mechanism in a counterclockwise direction. In this manner stripped foliage and crop delivered by the lateral end portions of the picking reel onto floor 113 is cyclically pushed toward conveyer belt 122.

Means are preferably provided to prevent the reel 52 from throwing stripped foliage and crop upwardly toward the harvester operator sitting on seat 34. As shown in FIGS. 3 and 4, such means comprises a screen 145 extending across the upwardly and rearwardly converging trough and is suitably secured at its opposite ends to trough side walls 116. Immediately in front of this screen 145 and behind reel 52 is the reel cleaning means 47 which is shown as a rotary brush the shaft 107 of which is shown in FIG. 3 as being arranged to the rear of, slightly above and parallel to reel shaft 68. The ends of shaft 107 are suitably journaled on walls 43 and 44. The left end of this shaft 107 extends through left wall 44 and has a driven sprocket gear 117 fast to its outer end and driven by a sprocket chain 127 passing around a drive sprocket gear 137 fast to the outer left end of reel shaft 68, as best shown in FIGS. 1 and 4. Shaft 107 and hence brush 47 is rotated in a clockwise direction as viewed in FIG. 3 so that the free end portions of the radial bristles of this brush engage the tine devices 76 and keep the same from plugging up with stripped foliage and crop.

A top transverse tie plate 149 is shown as suitably secured to trough side walls 116 at their rear ends to assist in rigidifying the trough structure.

Subframe 40 and the elements supported thereby are mounted for pivotal movement about axis X—X extending transversely of the direction of harvester travel T, as previously mentioned. The means for achieving this are shown in FIGS. 1–4 and 19 as comprising a pair of forwardly projecting arms 150 removably secured severally at their rear ends to main frame members 23 and each such arm having a cylindrical bearing sleeve 151 at its front end disposed with its axis horizontal and extending transversely of the harvester. Sleeves 151 are concentric and pivotally receive within their bores a pivot tube 152 which extends laterally outwardly beyond each sleeve. A pair of inclined brace beams 153 extend convergently forwardly from their rear ends which are severally fixed to the ends of tube 152 and are rigidly secured at their front ends to an angle member 154, best shown in FIG. 18.

Subframe 40 and the elements supported thereby are also mounted for pivotal movement about longitudinal axis Y—Y extending generally perpendicularly to the aforesaid transverse pivotal axis X—X as also previously mentioned. The means for achieving this are shown in FIGS. 1–4, 18 and 19 as comprising front and rear alined pivot pins 155 and 156, respectively, pivotally supporting subframe cross beams 41 and 42, respectively. These pivot pins incline upwardly and rearwardly so that their common axis Y—Y extends longitudinally centrally of the harvester and generally perpendicularly to the transverse axis X—X of pivot tube 152. As shown in FIG. 18, front pin 155 is secured to member 154 and is surrounded by bearing sleeve 158 secured to cross beam 41. As shown in FIGS. 3 and 15, the portion of transverse pivot tube 152 between bearing sleeves 151 is housed by a box-like structure 159 having upstanding side walls 160 which are embraced by the depending side walls 161 of channel-shaped rear cross beam 42. Rear pivot pin 156 is suitably arranged and retained in alined holes provided in walls 160 and 161.

Inasmuch as the left side of the picker mechanism 39 is heavier than the right side due to the drive mechanisms for the reel 52 and rollers 50 and 51 being mounted on the left side, a counterbalancing leaf spring assembly 162 is operatively interposed between member 154 and front cross beam 41 and is shown as secured at one end by U-bolts 163 to member 154 and at its other end upwardly thrustingly bearing against a metal pad 164 arranged on this beam to that side of front pivot pin 155 which is on the left side of the center of the harvester.

Each end of transverse pivot tube 152 has rigidly connected to it an upstanding lever arm 165 which can be swung about the axis X—X of such tube in order to raise and lower the picker mechanism 39. Means for so moving each of said lever arms 165 and arranged on each side of the harvester are shown as comprising a link 166 having one end pivoted at 168 on main frame member 23, another link 169 at one end pivotally connected to the free upper end of said lever arm, a pivot pin 170 pivotally connecting the other end of link 169 to the other end of link 166, a lever 171 pivotally mounted intermediate its ends on pivot pin 170, piston and cylinder hydraulic type actuator 172 having one end pivoted at 173 on frame member 23 and having its other end pivoted at 174 to one end of lever 171, a sprocket chain 175 having one end pivotally connected at 176 to the other end of lever 171 and having its other end connected at 178 to one end of a tension coil spring 179 which at its other end is suitably secured at 180 to frame member 23, the chain intermediate its ends passing around an idler sprocket gear 181 suitably mounted on frame member 23. A lug 182 carried by lever 171 between pivot pin 170 and chain connection 176 is adapted to engage link 166 when actuator 171 is operated for lifting the picker mechanism 39 and serves as a stop to limit relative movement between this lever and link. Normally when this mechanism rests on the ground, as shown, stop lug 182 is inoperative so that the springs 179 on both sides of the harvester are effective to counterbalance substantially the weight of this mechanism. Actuators 172 are suitably controlled remotely by the operator. This counterbalancing relieves ground engaging roller 51 of overload so that it floats the picker mechanism 39 and does not dig or plow into the ground; also allows for free lateral pivoting of the picker mechanism about axis Y—Y; and reduces the horsepower required for driving this roller.

Conveyer belt 122 is arranged to dump stripped foliage and crop onto a second conveyer means indicated generally at 183 which in turn dumps onto a third conveyer means indicated generally at 184 which in turn dumps into a receptacle indicated generally at 185 arranged at the rear of the harvester. While the stripped foliage and crop is conveyed by conveyer 183 the crop is acted upon by a cluster breaker assembly indicated generally at 186. While the stripped foliage and crop is conveyed by conveyer 184 a suction fan assembly indicated generally at 188 draws off the stripped foliage, leaving the crop to be discharged into receptacle 185.

Figure 2:
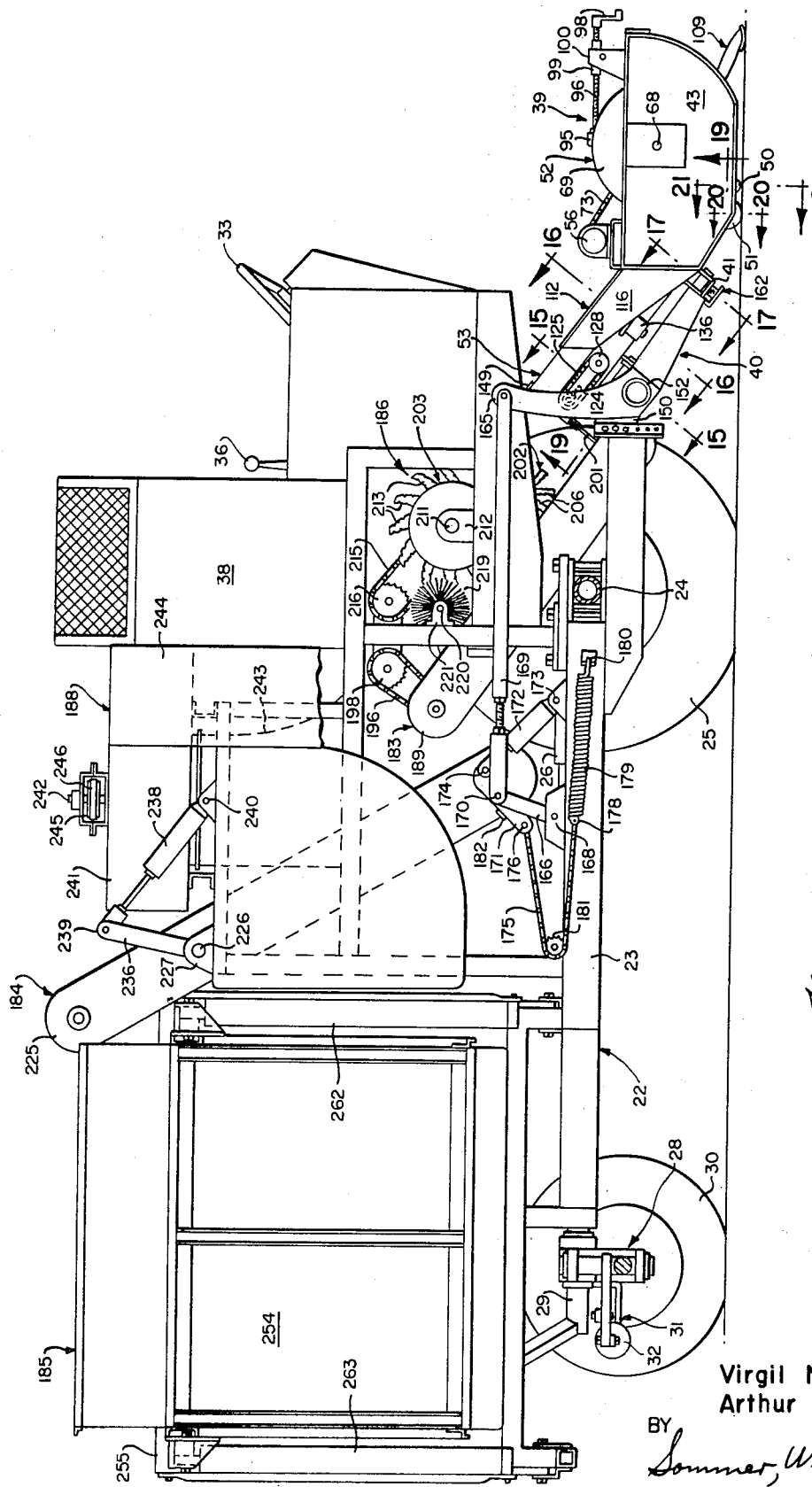
FIG. 2 is an elevational view of the right side of the harvester with the proximate front and rear wheels removed.

Conveyer 183 is shown in FIGS. 1–3 as comprising a pair of laterally spaced upwardly and rearwardly inclined vertical frame plates 189 suitably secured to main frame 22, a transverse driven roller 190 arranged between the lower front ends of plates 189 and suitably journaled thereon, a transverse drive roller 191 arranged between the upper rear ends of plates 189 and suitably journaled thereon, and an endless conveyer belt 192 perforate or imperforate passing around these rollers. For the lower flight 193 of this belt to clear the front axle 24, a transverse guide roller 194 is shown as journaled on frame plates 189 intermediate rollers 190 and 191 and engages lower flight 193 midway of its length to elevate the same. As shown in FIG. 1, the left end of the shaft of upper roller 191 has fast thereto a driven sprocket gear 195 connected by a sprocket chain 196 to a drive sprocket gear 198 fast to the output shaft of a hydraulic motor 199 suitably mounted on main frame 22. This motor drives sprocket gears 198 and 195 in a clockwise direction as viewed in FIG. 1 so that the upper flight 200 of conveyer belt 192 moves rearwardly from its lower end toward its upper end. In order to prevent stripped foliage and crop from tumbling off the lower end of conveyer belt 192 the subframe 40 of picker mechanism 39 is shown as having an elongated transversely extending brush 201 the bristles of which almost touch the top flight 200 of this conveyer belt, this brush acting as a flexible curtain wall and allowing heavy articles such as stones to fall therethrough.

Cluster breaker assembly 186 is shown in FIGS. 1–3 as comprising a front small rotor 202 and a rear larger rotor 203, both arranged above and extending transversely the full width of upper flight 200 of conveyer belt 192. Front rotor 202 is shown as having a horizontal shaft 204 the opposite ends of which are suitably journaled on main frame 22 as indicated at 205. From shaft 204 radially extend a series of edge-notched parallel-edged flat-sided plate arms 206 which are spaced circumferentially and longitudinally of this shaft. The left end of this shaft is shown in FIG. 1 as having a driven sprocket gear 208 fast thereto around which passes a sprocket chain 209 which also passes around a drive sprocket gear 210 fast to the shaft for upper roller 191 whereby shaft 204 rotates in a clockwise direction as viewed in FIG. 1. Preferably rotor 202 is arranged so that its fingers 206 have their tips or outer free ends passing closely over the upper flight 200 of conveyer belt 192. Rear rotor 203 is shown as having a horizontal shaft 211 the opposite ends of which are suitably journaled on main frame 22 as indicated at 212. From shaft 211 generally radially extend a series of edge-notched curve-edged flat-sided plate arms 213 which are spaced circumferentially and longitudinally of this shaft. As viewed in FIG. 1, arms 213 rotate in a counterclockwise direction so that the leading edges of these arms are convex and their trailing edges are concave. These arms 213 on larger rotor 203 pass through the spaces between arms 206 on smaller rotor 202 and penetrate substantially the full depth of such spaces. Larger rotor 203 is shown in FIG. 1 as driven from the left end of its shaft on which a driven sprocket gear 214 is fast connected by a sprocket chain 215 passing around a drive sprocket gear 216 fast to the output shaft of a hydraulic motor 218 suitably mounted on main frame 22. Larger rotor 203 rotates at a higher angular speed than smaller rotor 202.

Behind larger rotor 203 is a rotary brush 219 arranged generally parallel to this rotor for the full length thereof. Brush 219 is shown as having radial bristles projecting from a horizontal shaft 220 at its ends suitably journaled on main frame 22 as indicated at 221 for rotation in a clockwise direction as viewed in FIG. 1. Brush shaft 220 is driven by a sprocket chain 222 passing around a driven sprocket gear 223 fast to this brush shaft and a drive sprocket gear 224 fast to large rotor shaft 211. The bristles of brush 219 overlap arms 213 on large rotor 203 and pass thereover to clean the same of debris that may tend to adhere to these arms.

The function of small rotor 202 is that its arms 206 pick up off the upper conveyer belt flight 200 clusters of crop such as a pair of beans having their stems joined together and carry them upwardly and overly toward the descending interdigital arms 213 on large rotor 203 which impinge such stems whereby the shearing action of the relatively moving arms 206 and 213 breaks or splits the stems to individualize the bean pods which fall back again onto the top flight 200 of conveyer belt 192.

The third conveyer 184 is shown in FIGS. 1–3 as comprising a pair of laterally spaced upwardly and rearwardly inclined vertical plates 225 pivotally mounted near their upper ends on a shaft 226 suitably journaled in bearing 227 mounted on main frame 22 for pivotal movement about an axis extending transversely of the harvester. A driven transverse roller 228 is arranged between the lower front ends of plates 225 and suitably journaled thereon. A drive transverse roller 229 is arranged between the upper rear ends of plates 225 and suitably journaled thereon. An endless belt 230 passes around these rollers 228 and 229 and has outstanding transversely extending cleats 231 arranged at intervals along the course of this belt. In its operative position shown, the lower end of conveyer 184 is arranged below the rear end of the second conveyer 183 and receives foliage and individualized crop dumped thereonto by this second conveyer, and the upper end of conveyer 184 overlaps the rim of receptacle 185. As shown in FIG. 1, left conveyer support plate 225 has mounted thereon above shaft 226 a hydraulic motor 232 having a drive sprocket gear 233 fast to its output shaft connected by a sprocket chain 234 passing around a driven sprocket gear 235 fast to the outboard left end of the shaft for roller 229.

As best shown in FIG. 2, means are provided for swinging conveyor 184 about the axis of its pivotal shaft 226 from its operative position shown to an inoperative position (not illustrated) in which this conveyer is substantially upright or vertically disposed, thereby retracting the upper end of this conveyer from an overlapping condition with respect to the rim of receptacle 185. For this purpose, such means are shown as including a generally upright lever arm 236 at its lower end fast to the right outboard end of shaft 226, and a piston and cylinder hydraulic type actuator 238 having one end pivotally connected at 239 to the upper end of arm 236 and having its other end pivotally anchored at 240 to main frame 22. Actuator 238 is normally extended by connecting it to a supply of pressurized oil so that conveyer frame plates 225 engage the rim of receptacle 185 which acts as a stop. However, upon venting actuator 238 the weight of conveyer 184 will tilt it to an upright position.

As foliage and individualized crop are elevated by conveyer 184, it is subjected to the action of suction fan assembly 188 to remove the foliage, leaving the crop on the conveyer for ultimate discharge into receptacle 185. Such suction fan means is shown as including a scroll housing 241 of any suitable conventional type of fan suitably supported on main frame 22 and in which an impeller (not shown) is arranged for rotation about the axis of vertical shaft 242 which projects upwardly through this housing, an inlet hood 243 depending from the inlet eye at the bottom of housing 241 and having its lower end portion flared and covering a portion of conveyer 184, and a discharge duct 244 connected to the side outlet of housing 241 and leading across the top of the harvester and thence downwardly along the right side thereof for discharge under the harvester. In this manner the separated stripped foliage is discharged onto the ground along the harvested swath already traversed by the harvester. The means for driving the suction fan are shown as including a driven pulley 245 fast to the upper end of fan shaft 242 and connected by an endless belt 246 which passes around a drive pulley 248 fast to the output shaft of a hydraulic motor 249 suitably mounted on main frame 22.

Figure 6:
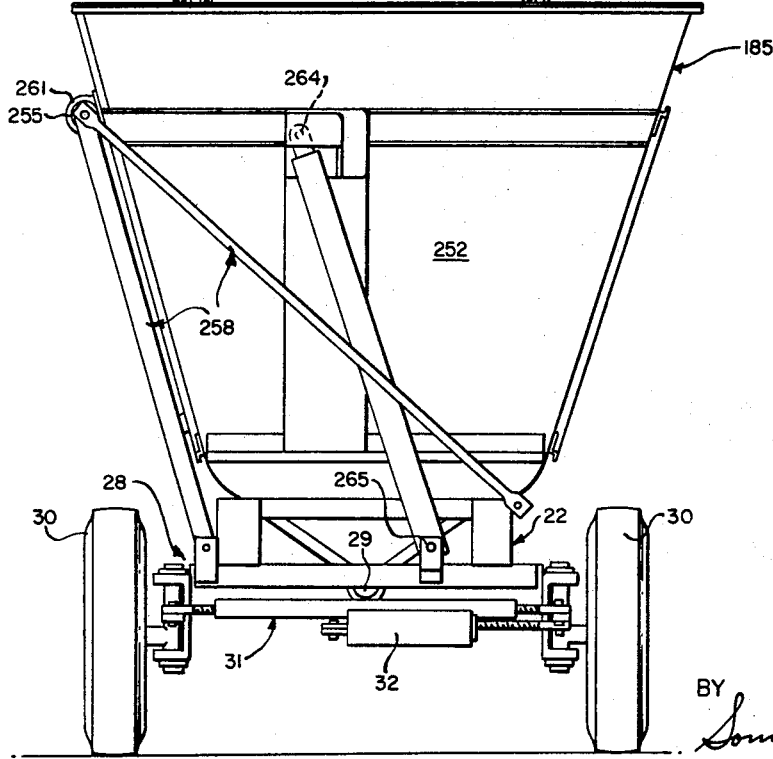
FIG. 6 is a rear end elevational view of the harvester.

Receptacle 185 when in crop receiving position as illustrated is shown as resting on a raised part of the main frame 22 at the rear end of the harvester so as to be disposed over rear wheels 30. The receptacle 185 is shown as hopper-like in configuration having a flat bottom 250 of rectangular outline from the front and rear edges of which rise front and rear parallel walls 251 and 252, respectively, and from the side edges of which rise left and right side walls 253 and 254, respectively, which are upwardly divergently inclined. The adjacent edges of walls 251-254 are suitably joined together as by welding. Receptacle 185 is adapted to be tilted or tipped toward the left side of the harvester about a horizontal axis extending fore and aft of the harvest and adjacent the upper end of left wall to dump its contents when desired. For this purpose, an elongated horizontal pivot pin 255 is supported by a suitable superstructure mounted on main frame including a front truss 256 arranged in front of receptacle 185 and a rear truss 258 arranged in rear of this receptacle, these trusses being rigidified by cross-bracing members 259 on the left side of the harvester. Surrounding and rotatable on this pivot pin between trusses 256 and 258 is a sleeve 260 connected by a plurality of U-bolts 261 to left side wall 253 of receptacle 185. Front and rear hydraulically operated piston and cylinder type actuators 262 and 263, respectively, are operatively interposed between receptacle 185 and main frame 22. The pivotal connections of these actuators to this receptacle are eccentric to the axis of pivot pin 255, such connection for the upper end of the rear actuator being indicated at 264 in FIG. 6 wherein the pivotal connection for the lower end of this rear actuator is indicated at 265. It will be visualized that when actuators 262 and 263 are supplied with pressurized oil to extend them, receptacle 185 will be tipped upwardly or pivoted about its pivotal axis provided by pin 255 in a counterclockwise direction as viewed from the rear of the harvester illustrated in FIG. 6. As previously explained, before receptacle 185 is so tipped or pivoted, conveyer 184 will have been moved to an upright position in which its upper end will no longer interfere with the upward movement of this receptacle.

It will be understood that all of the hydraulically operated devices such as wheel drive motor 26, steering wheels actuator 32, reel and roller drive motor 56, turntable drive motors 136, conveyer drive motors 128, 199 and 232, cluster breaker drive motor 218, suction fan drive motor 249, picker mechanism lifter actuators 172, conveyer actuator 238, and receptacle actuators 262 and 263, are selectively operated as to time and speed by the controls indicated at 35 and 36 adjacent the harvester operator's seat 34. The hydraulic circuitry for so selectively operating these hydraulic devices is well known to those skilled in the art as a straight-forward application of hydraulic powering and control know-how and needs no illustration nor description herein.

OPERATION

The operator sitting on seat 34 is able to manipulate steering wheel 33 and controls 35 and 36. Assuming the harvester is remote from a picking site, the operator controls actuators 172 to lift the picker mechanism 39 so as to hold it elevated off the ground. The operator then drives the harvester toward the picking site by manipulating steering wheel 33 and the controls for propulsion motor 26. Upon arrival at the picking site, he halts the vehicle and manipulates the appropriate controls to lower the picker mechanism and to drive hydraulic motor 56 for rotating reel 52, rollers 50 and 51 and brushes 37 and 47; hydraulic motors 136 for rotating turntables 129 and 130; hydraulic motors 128, 199 and 232 for belt conveyers 122, 192 and 230 and cluster breaker rotor 202; hydraulic motor 218 for cluster breaker rotor 203 and brush 219; hydraulic motor 249 for suction fan shaft 242; and actuator 238 for rear conveyer 184.

With these various hydraulic devices operating the operator then controls propulsion of the harvester over a bed of crop bearing plants to be harvested, making a swath the transverse width of the picker mechanism which is the widest part of the harvester. In traveling over the plants, rotating brush 37 engages the tops of the plants which is effective to lean them back toward reel 52. This reel lays the plants over front roller 50 and onto surface 48 of member 45, during which this roller is urging the stems of the plants toward the ground and also urging the stems laterally or longitudinally of this roller. The combined effect of roller 50 acting in this manner with the tined reel strips the foliage and crop from the plant stems without uprooting them.

It will be understood that the rotational speed of reel 52 can be regulated by the operator through control of the flow rate of pressurized oil to hydraulic motor 56. Also, the attack angle of tines 80 may be adjusted as desired by turning crank 98. These adjustments are made to provide optimum harvesting efficiency for a given crop.

Likewise, the other hydraulic motors can have the supply of pressurized oil servicing them regulated as to flow by the operator in order to provide the desired hydraulic drive, whether for the turntables, belt conveyers or cluster breaker, and depending on the particular crop being harvested.

As previously mentioned, stripped foliage and crop deposited onto floor 113 is pushed by turntable-moved walls 131 toward front conveyer belt 122, which discharges this material over its elevated rear end onto the depressed front end of intermediate conveyer belt 192. As this material is moved upwardly by this belt 192, the cluster breaker 186 is effective in individualizing the crop. The material discharged over the elevated rear end of conveyer belt 192 is received on the depressed front end of rear conveyer belt 230. The stripped foliage on this belt while moving under suction fan inlet 243 is drawn upwardly by fan 188 and ultimately discharged under the main frame 22. The separated crop remaining on rear conveyer belt 230 is discharged over its elevated rear end into receptacle 185.

When this receptacle 185 is sufficiently full, rear conveyer actuator 238 is vented to allow conveyer 184 to swing out of the path of this receptacle when tilted. This tilting is accomplished by controlling the flow of pressurized oil with respect to actuators 262 and 263. After the receptacle dumps its contents, its actuators 262 and 263 are regulated to return the receptacle to its normal crop-receiving position illustrated. Thereafter rear conveyer actuator 238 is activated to restore the conveyer 184 to its operative position illustrated.

MODIFICATION OF FIGS. 22–23

When harvesting certain crops such as dry beans, some of their pods have a tendency to shatter or shell while being stripped from the plants, thereby freeing the beans. With the form of the invention shown in FIGS. 1–21, some of these beans can fall to the ground through the space 266 between the downturned rear flange 268 of member 45 and the front end of front conveyer 122, as best shown in FIG. 9; and can also be directed toward the extreme outer front corners of floor 113 adjacent turntables 129 and 130 so as not to be picked up by movable walls 131 connected to these turntables whereupon the beans roll down this floor and back over the surface 48 of member 45 to the ground.

Figure 22:
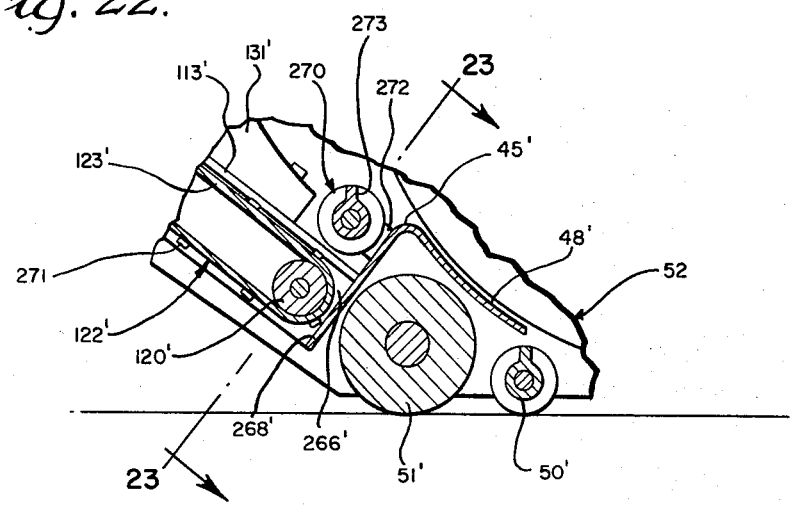
FIG. 22 is an enlarged fragmentary view similar to FIG. 3 and showing a modification of some structural features of the picker mechanism.
Figure 23:
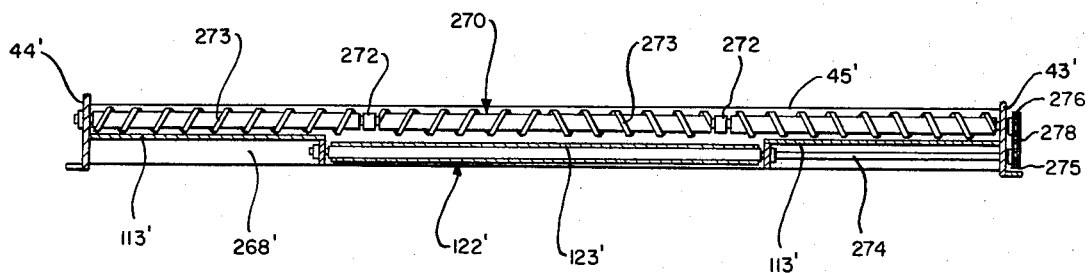
FIG. 23 is a fragmentary transverse sectional view thereof on a reduced scale, taken on line 23—23 of FIG. 22.

In order to prevent this loss of crops, the modification of picker mechanism shown in FIGS. 22–23 can be employed. Where elements shown in FIGS. 22–23 are referred to and are similar to the corresponding elements shown in FIGS. 1–21, the same numerals have been used except as distinguished by a prime.

Accordingly, referring to FIGS. 22–23, there is shown a transverse member 45' having a flange 268' covering a driven ground engaging roller 51' in front of which is disposed a driven helically surfaced plant engaging roller 50', and a reel 52' rotatably arranged above surface 48'. The floor 113' is set lower relative to the apex of surface 48' and flange 268' to accomodate a transverse screw conveyer 270 arranged immediately above floor 113' and immediately behand flange 268' adjacent its upper end. This necessitates lowering slightly other elements above and below floor 113' in order to maintain their same relation thereto, such elements including movable wall 131', and front conveyer belt 122' with its front roller 120'. Screw conveyer 270 is also disposed above roller 120' so that if material is dumped off the rear side of this screw conveyer it will fall onto the upper flight 123' of belt conveyer 122' which is also shown as having transverse cleats 271 thereon.

Screw conveyer 270 is shown as extending the full transverse distance between side walls 43' and 44' and has its ends suitably journaled on these walls. At intervals intermediate its ends this conveyer is suitably journaled on flange 268' as indicated at 272. The peripheral surface of this screw conveyer is shown as provided with a helical land or thread 273, one section of which for half the length of the conveyer will move material in one direction toward the center of the harvester and onto the upper flight of 123' of belt conveyer 122' and the other half section of thread has an opposite twist to move material in the opposite direction but again toward the center of the harvester and onto this upper flight of the belt conveyer. Not only will the intermediate portion of screw conveyer 270 substantially prevent material from falling into the space 266' between flange 268' and belt conveyer 122', but the end portions of this screw conveyer will move material from the dead corners at the front of floor 113' toward belt conveyer 122' and prevent such material from returning to ground by falling back over the surface 48' of member 45'.

While screw conveyer 270 may be driven in a counter-clockwise direction as viewed in FIG. 22 in a variety of ways, the means shown for accomplishing this comprise a rightward extension 274 of the shaft of front belt roller 120' through right wall 43', a drive sprocket gear 275 fast to the outer end of this shaft extension, a driven sprocket gear 276 fast to the outer right end of the shaft for screw conveyer 270, and a sprocket chain 278 passing around these gears.

A harvester equipped with the modification shown in FIGS. 22 and 23 will otherwise operate in the same manner as described for the form of the invention illustrated in FIGS. 1–21.

What is claimed is:

1. In a harvester adapted to travel over plants bearing crop to be harvested, the combination comprising a fixed member proximate ground level having a leading edge extending transversely of the line of harvester travel and also having an upper surface, a driven roller extending along said edge and projecting forwardly therefrom and adapted to engage the plants to be harvested, roller rotating means arranged to drive said roller in a direction so that its leading side moves downwardly, stripping means arranged to lay the plants rearwardly over said roller and said surface and to strip the foliage and crop from said plants substantially without uprooting their stems, and means for conveying the stripped foliage and crop away from such stripping site.

2. A harvester according to claim 1 wherein said roller rotating means drives said roller at a peripheral speed greater than the peripheral speed would be if said roller rolled on the ground.

3. A harvester according to claim 2 wherein said roller has an upset peripheral surface so arranged as to move said plants longitudinally of said roller while laid thereacross.

4. A harvester according to claim 3 wherein said upset peripheral surface is provided by a helical land on said roller.

5. A harvester according to claim 2 wherein said surface at said edge is substantially tangent to said roller.

6. A harvester according to claim 2 which further comprises a driven ground engaging roller supporting said member in rear of the plant engaging roller.

7. A harvester according to claim 6 wherein said ground engaging roller is driven in the same direction as for said plant engaging roller and at a slower rotational speed but at a peripheral speed greater than what it would be if said ground engaging roller rolled on the ground.

8. A harvester according to claim 2 wherein said foliage stripping means comprises a rotatable tined reel having an axis of rotation arranged in front of, above and substantially parallel to the plant engaging roller.

9. A harvester according to claim 8 wherein said reel includes a plurality of circumferentially spaced rows of tines and means arranged to project said tines downwardly at all times.

10. A harvester according to claim 9 wherein said reel further includes means for adjusting the angular position of said tines with respect to vertical, whereby the attack angle of said tines relative to the plants to be harvested may be varied.

11. A harvester according to claim 9 wherein said reel further includes a first end head and a rod journaled on said end head and arranged eccentric to said reel axis of rotation for supporting each row of tines, and such tine projecting means includes a planetary drive mechanism comprising a driven sprocket gear fast to the end of each of said rods, a continuous chain passing over said driven gears and means for rotatively driving one of said driven gears relative to said end head at the same angular speed as said reel is rotatively driven relative to said member.

12. A harvester according to claim 11 wherein said planetary drive mechanism further comprises an idler sprocket gear arranged between each pair of adjacent driven gears, said chain passing over said driven gears and under said idler gears, and said means for rotatively driving one of said driven gears comprising a fixed sprocket gear concentric with said reel axis of rotation, another sprocket gear concentric with said one of said driven gears and non-rotatively fast thereto, a sprocket chain passing around said fixed gear and said another gear and means for rotating said end head about said reel axis of rotation.

13. A harvester according to claim 12 which further comprises means for selectively adjusting the angular position of said fixed gear thereby to vary the attack angle of said tines relative to the plants to be harvested.

14. A harvester according to claim 11 wherein said reel further includes a second end head, an intermediate support between said end heads, each of said rods having a short section journaled on said first end head and a long section journaled on said second end head and intermediate support, and a coupling removably joining each of such pairs of rod sections.

15. A harvester according to claim 8 wherein a plurality of plant lifter arms extend forwardly from said fixed member.

16. A harvester according to claim 1 wherein said conveying means comprises trough means extending rearwardly from said fixed member and narrowing in a rearward direction and having a floor provided with a central rectangular opening and a circular side opening on each side of said rectangular opening, conveyer means including an endless conveyer belt having a flight arranged in said rectangular opening at about the level of said floor, means on each lateral side of said belt for pushing stripped foliage and crop toward said belt comprising a turntable rotatably arranged in each of said circular openings substantially coterminous with said floor and an extensible and contractible wall at one end pivotally connected eccentrically to said turntable and at its other end pivotally supported proximate said belt adjacent the rear end thereof.

17. A harvester according to claim 1 which further comprises a main frame, lever means mounted on said main frame for pivotal movement about an axis extending transversely of the line of harvester travel, a subframe mounted on said lever means for pivotal movement about an axis extending generally perpendicularly to such transverse pivotal axis, said fixed member, driven roller, roller rotating means, foliage stripping means and conveying means being supported on said subframe, and means for pivoting said lever means about said transverse pivotal axis to vary the elevation of said subframe and the elements supported thereby.

18. A harvester according to claim 17 which further comprises spring means operatively interposed between said lever means and subframe for substantially counterbalancing said subframe and the elements supported thereby about such perpendicular pivotal axis.

19. A harvester according to claim 17 wherein such lever pivoting means comprises a lever arm, a first link at one end pivoted on said main frame, a second link at one end pivotally connected to said lever arm, a pivot pin pivotally connecting the other end of said first link to the other end of said second link, a second lever pivotally mounted intermediate its ends on said pivot pin, an actuator operatively interposed between one end of said second lever and said main frame, spring means operatively interposed between the other end of said second lever and said main frame, and stop means limiting the pivotal movement of said second lever relative to said first link about the axis of said pivot pin when said actuator is operated in a subframe lifting direction.

20. A harvester according to claim 19 wherein said lever pivoting means is provided on each side of the harvester, and said stop means is inoperative when said fixed member is proximate ground level, whereby said spring means substantially counterbalances said subframe and the elements supported thereby about said transverse pivotal axis.

21. A harvester according to claim 1 wherein said conveying means comprises first, second and third conveyers, said first conveyer dumping stripped foliage and crop onto said second conveyer, cluster breaker means for individualizing the crop as it travels on said second conveyer, said second conveyer dumping stripped foliage and crop onto said third conveyer, suction fan means for removing said stripped foliage from the stripped crop as it is being dumped onto said third conveyer, and a receptacle for receiving separated stripped crop from said third conveyer.

22. A harvester according to claim 1 which further comprises a main frame, a subframe mounted for pivotal movement relative to said main frame about an axis extending transversely of the line of harvester travel and also about an axis extending generally perpendicularly to such transverse pivotal axis, said conveying means comprising first, second and third conveyers, said fixed member, driven roller, roller rotating means, foliage stripping means and first conveyer being supported on said subframe, means mounting said second conveyer on said main frame to receive stripped foliage and crop dumped by said first conveyer, a tiltable receptacle on said main frame, and means mounting said third conveyer on said main frame for disposition in operative and inoperative positions, said third conveyer when in said operative position overlapping the rim of said receptacle and arranged to receive stripped crop dumped by said second conveyer and to deliver it to said receptacle, said third conveyer when in said inoperative position being out of the way to allow tilting of said receptacle.

23. A harvester according to claim 1 wherein said upper surface terminates in a transverse rear edge, and said conveying means comprises a trough including a floor offset downwardly with respect to said rear edge and having a central opening and transverse screw conveyer means rotatably arranged above said floor proximate said rear edge and arranged to move stripped foliage and crop toward said opening.

24. A harvester according to claim 16 wherein said upper surface terminates in a transverse rear edge, said floor is offset downwardly with respect to said rear edge, and said conveying means further comprises driven transverse screw conveyer means rotatably arranged above said floor proximate said rear edge and arranged to move stripped foliage and crop toward said rectangular opening.

* * * * *